US011256936B2

(12) United States Patent
Katsumata

(10) Patent No.: US 11,256,936 B2
(45) Date of Patent: Feb. 22, 2022

(54) VEHICLE OCCUPANT COUNT MONITORING SYSTEM

(71) Applicant: Yazaki Corporation, Tokyo (JP)

(72) Inventor: Kenichi Katsumata, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 301 days.

(21) Appl. No.: 16/420,490

(22) Filed: May 23, 2019

(65) Prior Publication Data

US 2019/0392233 A1 Dec. 26, 2019

(30) Foreign Application Priority Data

Jun. 20, 2018 (JP) .............................. JP2018-116649

(51) Int. Cl.
*G06K 9/00* (2006.01)
(52) U.S. Cl.
CPC ..... *G06K 9/00838* (2013.01); *G06K 9/00288* (2013.01); *G06K 9/00369* (2013.01)
(58) Field of Classification Search
CPC ........... G06K 9/00838; G06K 9/00362; G06K 9/00369
See application file for complete search history.

(56) References Cited

U.S. PATENT DOCUMENTS

| | | | | |
|---|---|---|---|---|
| 2,861,699 A | * | 11/1958 | Youmans | B25J 13/02 414/4 |
| 5,983,147 A | * | 11/1999 | Krumm | G06K 9/00838 701/45 |
| 6,771,818 B1 | * | 8/2004 | Krumm | G06K 9/00369 382/154 |
| 7,110,570 B1 | * | 9/2006 | Berenz | B60R 25/25 382/104 |
| 2006/0209072 A1 | * | 9/2006 | Jairam | G06K 9/6267 345/440 |
| 2008/0047770 A1 | * | 2/2008 | Breed | B60T 7/06 180/273 |

(Continued)

FOREIGN PATENT DOCUMENTS

| | | |
|---|---|---|
| JP | 2015-7953 A | 1/2015 |
| JP | 2015-200933 A | 11/2015 |

OTHER PUBLICATIONS

L. D. Pizzo, P. Foggi, A. Greco, and G. Percannella, Counting people by rgb or depth overhead cameras. Pattern Recogn Lett, 2016. (Year: 2016).*

(Continued)

*Primary Examiner* — Michael Robert Cammarata
(74) *Attorney, Agent, or Firm* — Sughrue Mion, PLLC

(57) ABSTRACT

A vehicle occupant count monitoring system includes: an imaging unit that captures a depth image including a distance to an occupant in a cabin of a vehicle; a facial recognizing unit that recognizes a face of the occupant from the depth image captured by the imaging unit; an upper half body recognizing unit that recognizes an upper half body of the occupant from the depth image captured by the imaging unit; and a counting unit that counts the number of occupants by combining a recognition result of the face using the facial recognizing unit and a recognition result of the upper half body using the upper half body recognizing unit.

8 Claims, 9 Drawing Sheets

(56) References Cited

U.S. PATENT DOCUMENTS

| | | | |
|---|---|---|---|
| 2008/0074894 A1* | 3/2008 | Decoster | B60R 21/01538 362/488 |
| 2013/0051677 A1* | 2/2013 | Lee | H04N 21/44218 382/192 |
| 2013/0136313 A1* | 5/2013 | Maeda | G06F 16/583 382/111 |
| 2013/0148845 A1* | 6/2013 | Maeda | G01S 17/89 382/103 |
| 2013/0342652 A1* | 12/2013 | Kikkeri | B25J 9/104 348/46 |
| 2014/0074566 A1 | 3/2014 | McCoy et al. | |
| 2014/0161305 A1* | 6/2014 | Lee | G01B 11/254 382/103 |
| 2014/0254880 A1* | 9/2014 | Srinivasan | G06K 9/00335 382/106 |
| 2014/0282644 A1* | 9/2014 | Terrazas | H04N 21/44218 725/12 |
| 2014/0375808 A1 | 12/2014 | Kao et al. | |
| 2015/0049910 A1* | 2/2015 | Ptucha | G06K 9/621 382/103 |
| 2015/0331105 A1* | 11/2015 | Bell | G01S 17/89 356/4.01 |
| 2016/0086350 A1* | 3/2016 | Michel | G06T 7/285 382/103 |
| 2017/0039417 A1* | 2/2017 | Saruta | G06K 9/00228 |
| 2017/0344832 A1* | 11/2017 | Leung | G06K 9/00342 |
| 2019/0232974 A1* | 8/2019 | Reiley | B60W 60/0013 |
| 2019/0258866 A1* | 8/2019 | Khadloya | G08B 13/19695 |
| 2019/0318491 A1* | 10/2019 | Laganiere | G06K 9/00369 |
| 2021/0001862 A1* | 1/2021 | Senechai | G06K 9/00281 |

OTHER PUBLICATIONS

Siyuan Chen, F. Bremond, Hung Nguyen and H. Thomas, "Exploring depth information for head detection with depth images," 2016 13th IEEE International Conference on Advanced Video and Signal Based Surveillance (AVSS), 2016, pp. 228-234, doi: 10.1109/AVSS.2016.7738060. (Year: 2016).*

D. Merad, K. E. Aziz and N. Thome, "Fast People Counting Using Head Detection From Skeleton Graph," 2010 7th IEEE International Conference on Advanced Video and Signal Based Surveillance, 2010, pp. 151-156, doi: 10.1109/AVSS.2010.91. (Year: 2010).*

B. Dan, Y. Kim, Suryanto, J. Jung and S. Ko, "Robust people counting system based on sensor fusion," in IEEE Transactions on Consumer Electronics, vol. 58, No. 3, pp. 1013-1021, Aug. 2012, doi: 10.1109/TCE.2012.6311350. (Year: 2012).*

M. Luber, L. Spinello, and K. Arras. Learning to detect and track people in rgbd data. In RGB-D Workshop, RSS, 2011. (Year: 2011).*

D. Ramanan and D. A. Forsyth, "Finding and tracking people from the bottom up," 2003 IEEE Computer Society Conference on Computer Vision and Pattern Recognition, 2003. Proceedings., 2003, pp. II-II, doi: 10.1109/CVPR.2003.1211504. (Year: 2003).*

Micilotta A.S., (2006) Real-Time Upper Body Detection and 3D Pose Estimation in Monoscopic Images. In: Leonardis A., Bischof H., Pinz A. (eds) Computer Vision—ECCV 2006. ECCV 2006. (Year: 2006).*

Wongun Choi, et al., "Detecting and Tracking People using an RGB-D Camera via Multiple Detector Fusion", IEEE International Conference on Computer Vision Workshops, Nov. 6, 2011, pp. 1076-1083 (8 pages total).

* cited by examiner

FIG.4
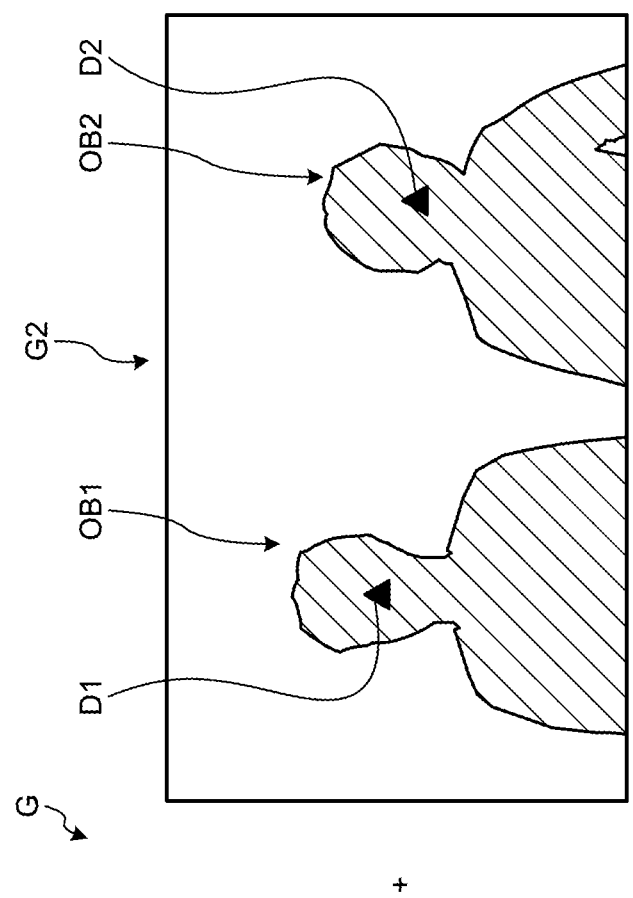
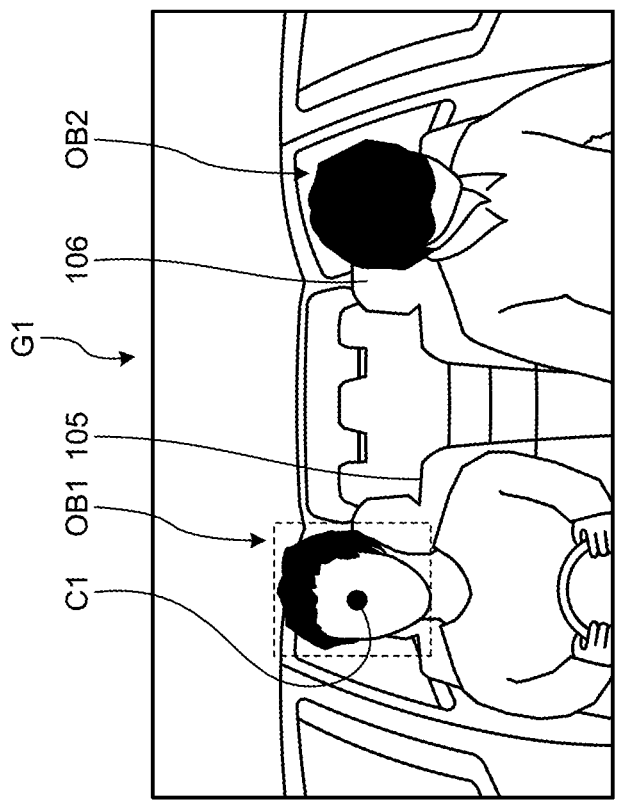

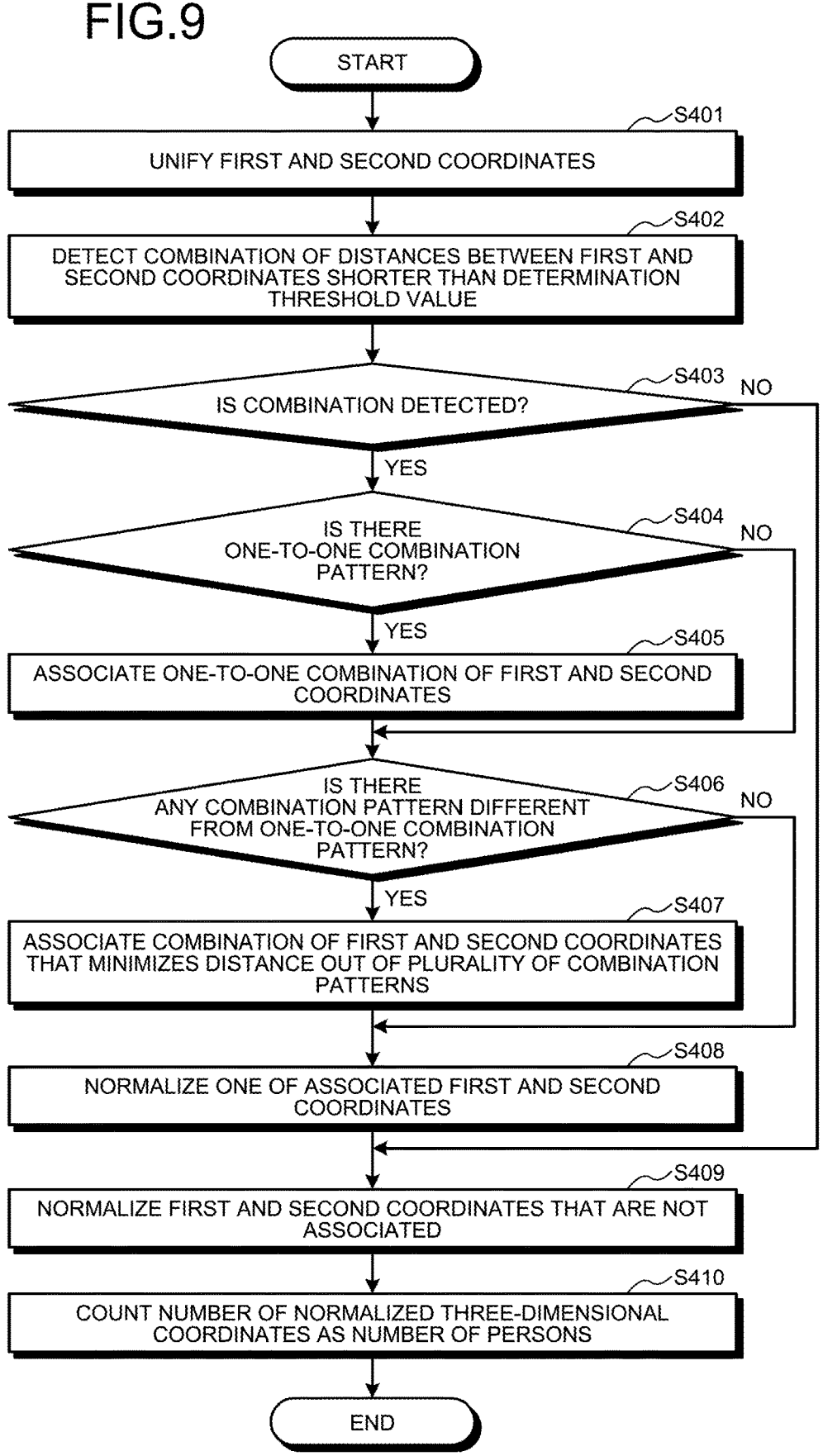

VEHICLE OCCUPANT COUNT MONITORING SYSTEM

CROSS-REFERENCE TO RELATED APPLICATION(S)

The present application claims priority to and incorporates by reference the entire contents of Japanese Patent Application No. 2018-116649 filed in Japan on Jun. 20, 2018.

BACKGROUND OF THE INVENTION

1. Field of the Invention

The present invention relates to a vehicle occupant count monitoring system.

2. Description of the Related Art

As a technique of monitoring the number of occupants riding on a vehicle, for example, an autonomous car has been disclosed, in which facial recognizing is performed for an image obtained by capturing all the passengers using a camera, and the number of occupants is counted on the basis of the number of occupant whose faces are recognized (refer to Japanese Patent Application Laid-open No. 2015-200933). In addition, Japanese Patent Application Laid-open No. 2015-007953 discusses a monitoring device for counting the number of occupants by segmenting an image into a plurality of recognizing blocks and determining whether or not an occupant exists in the recognizing blocks.

However, in the conventional counting method for counting the number of occupants riding on a vehicle, there is a demand for improving accuracy of the vehicle occupant counting.

SUMMARY OF THE INVENTION

In view of the aforementioned demands, an object of the invention is to provide a vehicle occupant count monitoring system capable of improving accuracy of the vehicle occupant counting.

In order to achieve the above mentioned object, a vehicle occupant count monitoring system according to one aspect of the present invention includes an imaging unit that captures a depth image including a distance to an occupant in a cabin of a vehicle; a facial recognizing unit that recognizes a face of the occupant from the depth image captured by the imaging unit; an upper half body recognizing unit that recognizes an upper half body of the occupant from the depth image captured by the imaging unit; and a counting unit that counts the number of occupants by combining a recognition result of the face using the facial recognizing unit and a recognition result of the upper half body using the upper half body recognizing unit.

According to another aspect of the present invention, in the vehicle occupant count monitoring system, it is possible to configure that the counting unit counts the number of occupants by combining three-dimensional first coordinates of the face recognized by the facial recognizing unit in the cabin and three-dimensional second coordinates of a head portion of the upper half body recognized by the upper half body recognizing unit in the cabin.

According to still another aspect of the present invention, in the vehicle occupant count monitoring system, it is possible to configure that when a distance between the first and second coordinates is shorter than a predetermined threshold value, the counting unit counts the number of occupants as one occupant by combining the face recognized by the facial recognizing unit and the upper half body recognized by the upper half body recognizing unit, and when the distance between the first and second coordinates is equal to or longer than the predetermined threshold value, the counting unit counts the number of occupants as each occupant without combining the face recognized by the facial recognizing unit and the upper half body recognized by the upper half body recognizing unit.

According to still another aspect of the present invention, in the vehicle occupant count monitoring system, it is possible to configure that when the distance between any one of the first and second coordinates and the other of the first and second coordinates is shorter than the predetermined threshold value, and there are a plurality of the other coordinates, the counting unit counts the number of occupants as one occupant by combining the first and second coordinates with the distance between them being short, and counts the number of occupants for the remaining coordinates as each occupant.

According to still another aspect of the present invention, in the vehicle occupant count monitoring system, it is possible to further include that an operation controller configured to perform warning when the number of occupants counted by the counting unit exceeds a predetermined seating capacity of the vehicle.

According to still another aspect of the present invention, in the vehicle occupant count monitoring system, it is possible to further include that a casing provided on a cabin side surface of a ceiling of the vehicle and mounted with at least one of the imaging unit, the facial recognizing unit, the upper half body recognizing unit, and the counting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an imaging example of the vehicle occupant count monitoring system according to the embodiment;

FIG. 9 is a flowchart illustrating an exemplary counting processing of the vehicle occupant count monitoring system according to the embodiment.

DETAILED DESCRIPTION OF THE PREFERRED EMBODIMENTS

Embodiments of the present invention will now be described in details with reference to the accompanying drawings. Note that the invention is not limited to such embodiments. In addition, elements of the embodiments described below include those readily substitutable by a person ordinarily skilled in the art or any substantial equivalent thereof.

Embodiment

Figure 1:
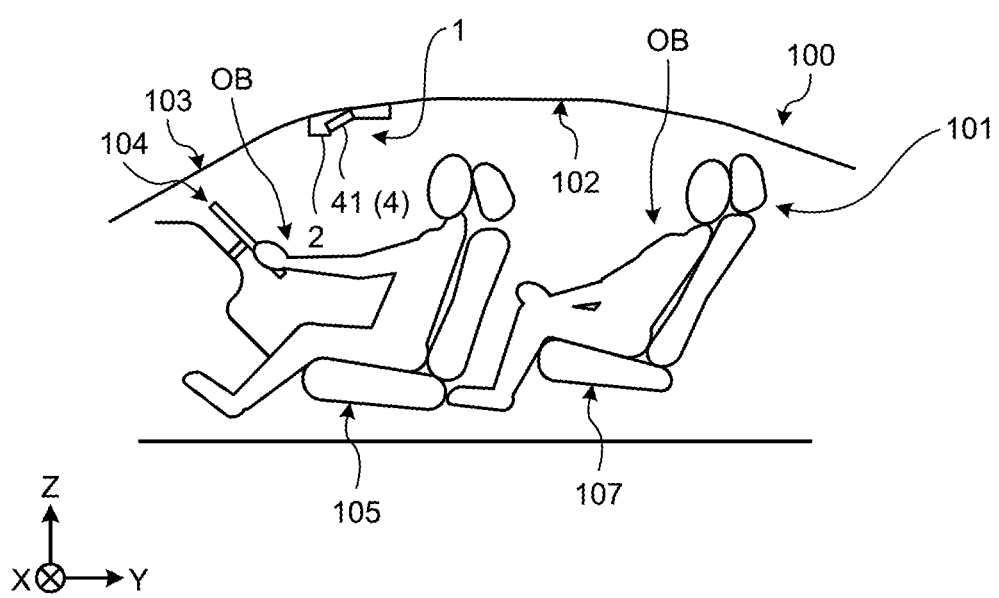
FIG. 1 is a schematic diagram illustrating a schematic configuration of a cabin of a vehicle to which a vehicle occupant count monitoring system according to an embodiment is applied.
Figure 2:
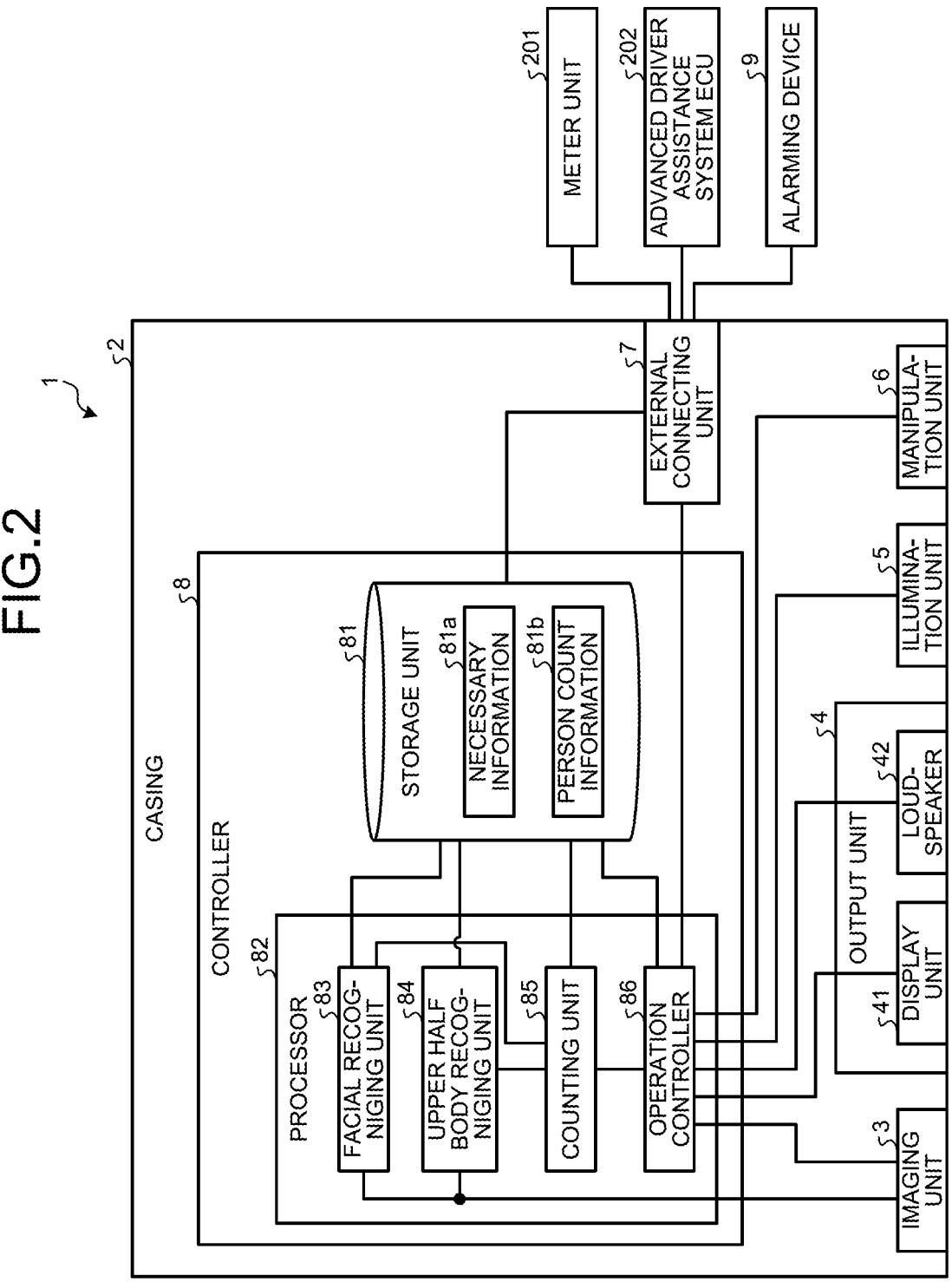
FIG. 2 is a block diagram illustrating a schematic configuration of the vehicle occupant count monitoring system according to the embodiment.
Figure 3:
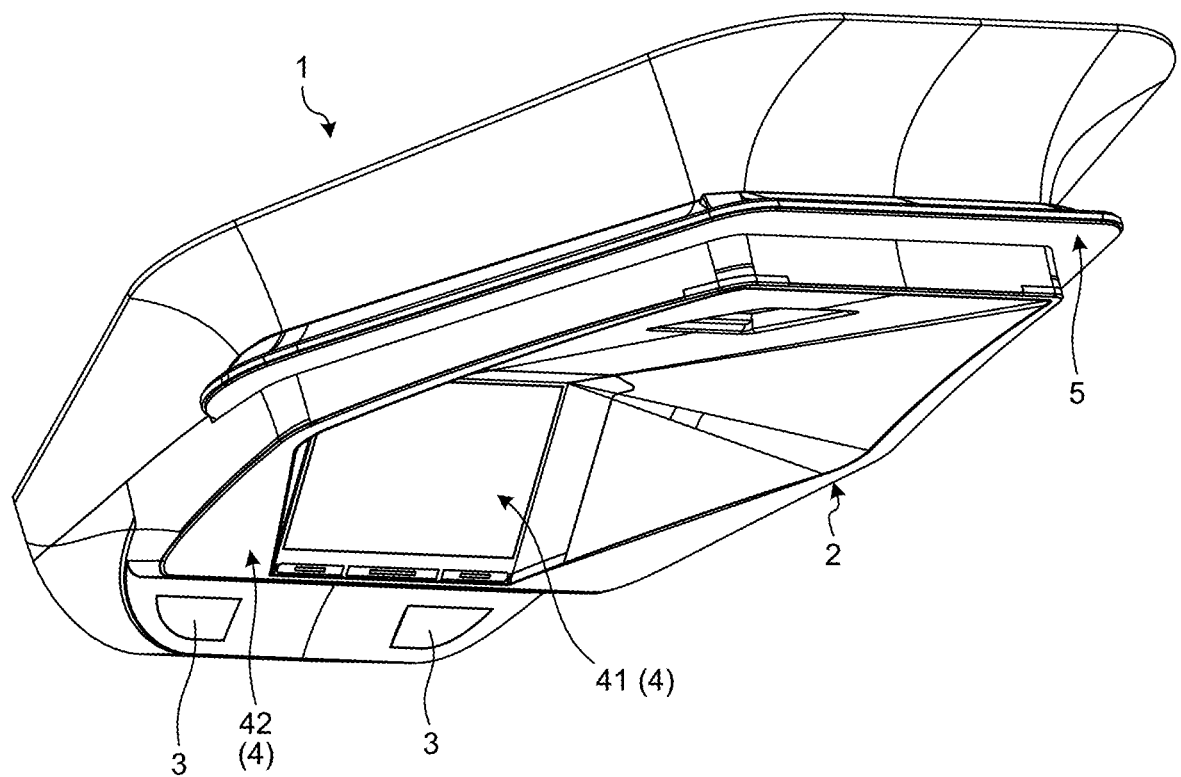
FIG. 3 is a perspective view illustrating an exterior of the vehicle occupant count monitoring system according to the embodiment.

An embodiment will be described with reference to FIGS. 1 to 5. FIG. 1 is a schematic diagram illustrating a schematic configuration of a cabin of a vehicle to which a vehicle occupant count monitoring system according to an embodiment is applied. FIG. 2 is a block diagram illustrating a schematic configuration of the vehicle occupant count monitoring system according to the embodiment. FIG. 3 is a perspective view illustrating an exterior of the vehicle occupant count monitoring system according to the embodiment. FIG. 4 is a diagram illustrating an imaging example of the vehicle occupant count monitoring system according to the embodiment. Note that the arrow direction X of FIG. 1 indicates a vehicle width direction of a vehicle 100. The arrow direction Y of FIG. 1 indicates a length direction (front-rear direction) of the vehicle 100. The arrow direction Z of FIG. 1 indicates a height direction of the vehicle 100.

The vehicle occupant count monitoring system 1 according to this embodiment illustrated in FIG. 1 is an in-vehicle system (vehicle cabin monitoring system) mounted on a vehicle 100 to monitor an occupant OB inside a cabin 101 of the vehicle 100 and conduct various processings for the occupant OB. The occupant OB is a monitoring object of the vehicle occupant count monitoring system 1. The occupant OB refers to an occupant boarding on the cabin 101 of the vehicle 100, including a driver of the vehicle 100 or a fellow passenger other than the driver.

In the example of FIG. 1, the vehicle 100 has a driver's seat 105 and a backseat 107. Note that, although it is assumed in this embodiment that the vehicle 100 is an automobile, the vehicle may also include, for example, a bus, a train, or the like. In addition, the vehicle occupant count monitoring system 1 according to this embodiment is provided on a cabin 101 side surface of a ceiling 102 of the vehicle 100 and constitutes an overhead module (OHM) into which various functions are consolidated.

A configuration of the vehicle occupant count monitoring system 1 will now be described in details with reference to FIGS. 1 to 4.

The vehicle occupant count monitoring system 1 includes a casing 2, an imaging unit 3, an output unit 4, an illumination unit 5, a manipulation unit 6, an external connecting unit 7, and a controller 8. Note that the vehicle occupant count monitoring system 1 included in the overhead module may additionally include, for example, a radio communication unit, an antenna, a power distribution unit, or the like.

The casing 2 houses each part of the vehicle occupant count monitoring system 1. The casing 2 is formed generally in a hollowed box shape by collating a plurality of members. The casing 2 is formed of synthetic resin having an insulating property. Here, the casing 2 is modularized as an overhead module by internally assembling and housing the imaging unit 3, the output unit 4, the illumination unit 5, the manipulation unit 6, the external connecting unit 7, and the controller 8. The imaging unit 3, the output unit 4, the illumination unit 5, the manipulation unit 6, and the external connecting unit 7 housed inside are partially exposed on the outer surface of the casing 2. In addition, the casing 2 according to this embodiment is provided on a cabin 101 side surface of the ceiling 102 (roof panel) of the vehicle 100. The ceiling 102 is a structure connected to a chassis body of the vehicle by interposing pillars or the like and supported upward in a vertical direction of the chassis body of the vehicle. The vehicle 100 is divided into the cabin 101 and an exterior with respect to the ceiling 102 as an upper vertical boundary. Here, the casing 2 is provided, for example, at an overlapping part between the ceiling 102 and a windshield 103 and substantially in the center of the vehicle 100 in the vehicle width direction.

The imaging unit 3 includes a three-dimensional time of flight (TOF) camera, a distance image sensor, or the like for measuring a distance to an occupant OB in the cabin 101 of the vehicle 100. The imaging unit 3 captures a depth image including a pixel by associating the distance to the occupant OB with a pixel value. The imaging unit 3 according to this embodiment has a function of capturing a depth image capable of measuring a three-dimensional location of a face and an upper half body of the occupant OB in the cabin 101. According to this embodiment, the imaging unit 3 can capture an image of an occupant OB even under a dark environment by using the TOF camera.

The imaging unit 3 is provided in the casing 2 such that a lens is exposed on the outer surface of the casing 2, and an optical axis is directed to the driver's seat 105 or the backseat 107 side in the cabin 101. The imaging unit 3 is electrically connected to the controller 8 to transmit or receive an electric signal to/from each other and control the operations of each part using the controller 8. For example, the imaging unit 3 outputs the captured depth image to the controller 8. Note that, although it is assumed that the imaging unit 3 is provided in the casing 2 in this embodiment, it may be provided separately, for example, in the front and rear lines of the vehicle 100.

For example, the depth image G of FIG. 4 is an image obtained by capturing the cabin 101 by the imaging unit 3, the cabin 101 including an occupant OB1 directed to the front on a driver's seat 105 and an occupant OB2 directed to the bottom on a front passenger seat 106. In this case, the depth image G includes a two-dimensional image G1 and a distance image G2 as three-dimensional information. The two-dimensional image G1 is an image indicating the occupants OB1 and OB2 and the cabin 101 as a background thereof. The two-dimensional image G1 is used in facial recognizing for the occupants OB1 and OB2. The distance image G2 is an image representing a depth, a height, a width, and a shape of an object in the cabin 101. The distance image G2 is used in upper half body recognizing for the occupants OB1 and OB2. Note that, in the example of FIG. 4, the distance image G2 represents only parts corresponding to the occupants OB1 and OB2 and does not contain a background part.

The output unit 4 outputs various types of information to the cabin 101 of the vehicle 100. Here, the output unit 4 has a display unit 41 and a loudspeaker 42. The display unit 41 is a display device for outputting visual information (such as graphic information or character information). The display unit 41 includes, for example, a thin liquid crystal display, a plasma display, an organic EL display, or the like. The loudspeaker 42 is an output device for outputting auditory information (such as voice information or sound information). Each of the display unit 41 and the loudspeaker 42 of the output unit 4 is electrically connected to the controller 8 to receive or transmit an electrical signal to/from each other, so that operations of each part are controlled by the controller 8.

The illumination unit 5 illuminates the cabin 101 of the vehicle 100 and includes, for example, a map lamp or the like. The illumination unit 5 is electrically connected to the controller 8 to transmit or receive an electric signal to/from each other, so that the operations of each part are controlled by the controller 8.

The manipulation unit 6 is a manipulation device capable of inputting various manipulations from the cabin 101 side of the vehicle 100. The manipulation unit 6 includes, for example, a push button, a non-contact sensor such as a capacitive touch switch or an infrared sensor, or the like. The manipulation unit 6 is electrically connected to the controller 8 to transmit or receive an electric signal to/from each other, so that the operations of each part are controlled by the controller 8.

The external connecting unit 7 is a part to which electric devices outside the casing 2 are electrically connected. The external connecting unit 7 includes various types of connectors or interface units. An alarming device 9 is electrically connected to the external connecting unit 7. The alarming device 9 may warn overloading to the occupant OB.

The external connecting unit 7 is electrically connected to an electronic control unit (ECU) that comprehensively controls each part of the vehicle 100, a rear module provided in a backseat position on a cabin 101 side surface of the ceiling 102 of the vehicle 100, or the like. The external connecting unit 7 is electrically connected to the controller 8 and an electric device outside the casing 2 to transmit or receive an electric signal to/from each other.

In the example of FIG. 2, the external connecting unit 7 is electrically connected to, for example, a meter unit 201 and an advanced driver assistance system (ADAS) ECU 202. The meter unit 201 is provided in front of the driver's seat 105 of the vehicle 100 and is visually recognizable from a driver, an occupant, or the like of the vehicle 100. The meter unit 201 includes, for example, a combination meter, a head-up display, a television, or the like of the vehicle 100.

The ADAS ECU 202 outputs surrounding information regarding surrounding situations of the vehicle 100. The surrounding information may contain, for example, surrounding image information obtained by imaging an external object such as a surrounding environment of the vehicle 100, a surrounding occupant of the vehicle 100, other vehicles, and an obstacle, external object information such as presence/absence of an external object, a relative distance or a relative speed from the external object, and a time-to-collision (TTC), or the like.

The controller 8 is a part for comprehensively controlling each part of the vehicle occupant count monitoring system 1. The controller 8 executes various computing processings regarding condition monitoring or various supports for the occupant OB. The controller 8 has an electronic circuit embedded with a microcomputer known in the art, including a central operation processing device such as a central processing unit (CPU), a micro processing unit (MPU), an application specific integrated circuit (ASIC), and a field programmable gate array (FPGA), a read only memory (ROM), a random access memory (RAM), and an interface. The controller 8 is electrically connected to the imaging unit 3, the output unit 4, the illumination unit 5, the manipulation unit 6, and the external connecting unit 7. The controller 8 can transmit or receive various electric signals such as an image signal corresponding to the depth image captured by the imaging unit 3 or a driving signal for driving each part to/from each part.

Specifically, the controller 8 includes a storage unit 81 and a processor 82 in terms of functional concept. The storage unit 81 and the processor 82 may transmit or receive various types of information to/from various devices electrically connected. The storage unit 81 is a storage device such as a memory. The storage unit 81 stores a condition or information necessary in various processings of the controller 8, various programs executed by the controller 8, or the like. In addition, the storage unit 81 also stores visual information such as a partial image displayed on the display unit 41 or auditory information such as sound output from the loudspeaker 42. Furthermore, the storage unit 81 can temporarily store information regarding the depth image captured by the imaging unit 3 or various types of information obtained via the external connecting unit 7. Various types of information are read from the storage unit 81 by the processor 82 as necessary. The processor 82 executes various programs stored in the storage unit 81 on the basis of various input signals or the like and executes various processings for implementing various functions by operating the program and outputting an output signal to each part.

In the example of FIG. 2, the storage unit 81 can store necessary information 81*a* and occupant count information 81*b*. The necessary information 81*a* contains conditions or information necessary for recognizing a face and a upper half body of the occupant OB or counting the number of occupants, or the like. For example, the necessary information 81*a* contains information regarding a learning dictionary used in recognizing of a face and a upper half body of the occupant OB or information representing a seating capacity of the vehicle 100, or the like. Note that an example of the learning dictionary will be described below. The occupant count information 81*b* contains information representing a result of counting the number of occupants OB in the cabin 101.

More specifically, the processor 82 includes a facial recognizing unit 83, a upper half body recognizing unit 84, a counting unit 85, and an operation controller 86 in terms of functional concept. The processor 82 implements the facial recognizing unit 83, the upper half body recognizing unit 84, the counting unit 85, and the operation controller 86 by executing a program.

The facial recognizing unit 83 recognizes a face of the occupant OB from the depth image G captured by the imaging unit 3. The facial recognizing unit 83 recognizes a face of the occupant OB on the basis of a pixel value obtained by scanning a two-dimensional image G1 of the depth image G, for example, using various techniques known in the art such as artificial intelligence or deep learning techniques. For example, the facial recognizing unit 83 recognizes a face of the occupant OB by collating a learning dictionary or the like contained in the necessary information 81*a* stored in the storage unit 81 and the two-dimensional image G1 of the depth image G captured by the imaging unit 3. Note that the learning dictionary is information in which face features or the like are made into a database using various methods based on artificial intelligence or deep learning techniques. The learning dictionary may be obtained from other electronic devices, for example, using the external connecting unit 7. In addition, the facial recognizing unit 83 may recognize the face of the occupant OB on the basis of a pixel value of the depth image G, for example, using a background subtraction method, a random forest method, a mean shift method, pattern matching, or the like. For example, the facial recognizing unit 83 may compare pixel value information between the two-dimensional image G1 of the depth image G captured by the imaging unit 3 and an interior image of the cabin 101 captured in advance, extract a pixel part having a pixel value different from that of the interior image as a human body part of the occupant OB, and recognize a face portion from this human body part. The facial recognizing unit 83 recognizes a face of the occupant OB directed to the front side of the vehicle 100 in the cabin 101. In addition, the facial recognizing unit 83 extracts a particular point of the recognized face of the occupant OB and calculates three-dimensional first coordinates of the particular point in the cabin 101. The particular point includes any point such as a center of the face, eyes, a nose, or a mouth. The facial recognizing unit 83 stores the calculated first coordinates in the storage unit 81 by associating them with the depth image.

For example, in a case where the face of the occupant OB is recognized from the two-dimensional image G1 of the depth image G shown in FIG. 4, the facial recognizing unit 83 can recognize the face of the occupant OB1 directed to the front side, but it is impossible to recognize the face of the occupant OB2 directed to the bottom. As a result, the facial recognizing unit 83 calculates first coordinates C1 as a center of the face of the occupant OB1 that can be recognized.

The upper half body recognizing unit 84 recognizes a upper half body of the occupant OB from the depth image G captured by the imaging unit 3. The upper half body recognizing unit 84 recognizes a upper half body of the occupant OB on the basis of distance information indicated by the pixel obtained by scanning the distance image G2 of the depth image G using various techniques known in the art such as artificial intelligence or deep learning techniques. For example, the facial recognizing unit 83 recognizes an upper half body of the occupant OB by collating the learning dictionary or the like contained in the necessary information 81*a* of the storage unit 81 and the distance image G2 of the depth image G captured by the imaging unit 3. Note that the learning dictionary is information in which an upper half body feature amount or the like are made into a database using various methods based on artificial intelligence or deep learning techniques. In addition, the facial recognizing unit 83 may compare distance information indicated by the pixels between the distance image G2 of the depth image G captured by the imaging unit 3 and the interior distance image of the cabin 101 captured in advance, extract a pixel part having a distance different from that of the interior image as a human body part of the occupant OB, and recognize a upper half body from the human body part. Furthermore, the upper half body recognizing unit 84 calculates three-dimensional second coordinates of a head portion of the upper half body in the cabin 101 as the upper half body of the recognized occupant OB is recognized. The upper half body recognizing unit 84 stores the calculated second coordinates in the storage unit 81 by associating them with the depth image.

For example, in a case where the upper half body of the occupant OB is recognized from the distance image G2 of the depth image G shown in FIG. 4, the upper half body recognizing unit 84 can recognize both the upper half body of the occupant OB1 directed to the front side and the upper half body of the occupant OB2 directed to the bottom. As a result, the upper half body recognizing unit 84 calculates second coordinates D1 and D2 as a center of the head portion of the upper half body of the occupants OB1 and OB2 that can be recognized.

The counting unit 85 counts the number of occupants OB by combining a facial recognition result for the occupant OB of the facial recognizing unit 83 and an upper half body recognition result for the occupant OB of the upper half body recognizing unit 84. In other words, the counting unit 85 counts the number of occupants OB by combining the face of the occupant OB recognized by the facial recognizing unit 83 and the upper half body of the occupant OB recognized by the upper half body recognizing unit 84. According to this embodiment, the counting unit 85 counts the number of occupants OB by combining three-dimensional first coordinates of the face recognized by the facial recognizing unit 83 in the cabin 101 and three-dimensional second coordinates of the upper half body recognized by the upper half body recognizing unit 84 in the cabin 101. The counting unit 85 stores the counted number of occupants OB as the occupant count information 81*b*. The counting unit 85 has a function of counting the number of occupants on the basis of a result of combining the first and second coordinates. If the distance between the first and second coordinates is shorter than a determination threshold value of the necessary information 81*b*, the counting unit 85 counts the number of occupants OB as "one occupant" by combining the face recognized by the facial recognizing unit 83 and the upper half body recognized by the upper half body recognizing unit 84. In other words, if the distance between the first and second coordinates is shorter than the determination threshold value of the necessary information 81*b*, the counting unit 85 counts a combination of the first and second coordinates as "one occupant". That is, the counting unit 85 determines that the first and second coordinates are three-dimensional coordinates of the same occupant OB if the distance is shorter than the determination threshold value of the necessary information 81*b*, so that overlapping of the three-dimensional coordinates is avoided by combining the first and second coordinates. In addition, if the distance between the first and second coordinates is equal to or longer than the determination threshold value of the necessary information 81*b*, the counting unit 85 counts the face recognized by the facial recognizing unit 83 and the upper half body recognized by the upper half body recognizing unit 84 as "each occupant" without combining them. In other words, if the distance between the first and second coordinates is equal to or longer than the determination threshold value of the necessary information 81*b*, the counting unit 85 counts each of the number of the first coordinates and the number of the second coordinates without combining the first and second coordinates. Note that the determination threshold value of the necessary information 81*b* is a threshold value for determining whether or not the first and second coordinates are for the same occupant OB. For example, if the first coordinates are three-dimensional coordinates indicating a center of a face, and the second coordinates are three-dimensional coordinates indicating a center of a head portion, the determination threshold value of the necessary information 81*b* is set to a predetermined threshold value by learning the distance between a center location of the general face and a center location of the head portion. In addition, if the distance between any one of the first and second coordinates and the other of the first and second coordinates is shorter than the determination threshold value, and there are a plurality of the other coordinates, the counting unit 85 has a function of counting the first and second coordinates with the distance between them being short as "one occupant" by combining them and counting the remaining coordinates as "each occupant".

In the example of FIG. 4, the counting unit 85 counts the number of occupants by combining the first coordinates C1 of the occupant OB1 calculated from the two-dimensional image G1 and the second coordinates D1 of the occupant OB1 and the second coordinates D2 of the occupant OB2 of the distance image G2. In this case, since the distance between the first coordinates C1 and the second coordinates D1 in the cabin 101 is shorter than the determination threshold value, the counting unit 85 combines the first coordinates C1 and the second coordinates D1 and counts this combination as "one occupant". In addition, since there is no first coordinates around the second coordinates D2 in the cabin 101, the counting unit 85 counts the second coordinates D2 as "one occupant". That is, since there are a single combination of the first and second coordinates C1 and D1 and one set of the second coordinates D2, the counting unit 85 counts the number of occupants in the cabin 101 as "two occupants". In this manner, since the first coordinates C1 and the second coordinates D1 of the occupant OB1 are repetitive, the counting unit 85 avoids repetitive counting of the three-dimensional coordinates.

The operation controller 86 is a part capable of executing an operation control processing. The operation control processing is a processing for controlling operations of each part of the vehicle occupant count monitoring system 1, such as the imaging unit 3, the output unit 4, the illumination unit 5, and the manipulation unit 6. The operation controller 86 is electrically connected to the imaging unit 3, the output unit 4 (including the display unit 41 and the loudspeaker 42), the illumination unit 5, the manipulation unit 6, the external connecting unit 7, and the storage unit 81. The operation controller 86 can control the operation of the imaging unit 3 by outputting a driving signal to the imaging unit 3 to start or terminate capturing of the depth image G containing the occupant OB. In addition, the operation controller 86 controls the operation of the output unit 4 by outputting a driving signal to the output unit 4 (including the display unit 41 and the loudspeaker 42) to display visual information on the display unit 41 or output auditory information from the loudspeaker 42. Furthermore, the operation controller 86 controls the operation of the illumination unit 5 by outputting a driving signal to the illumination unit 5 to turn on or off the illumination unit 5. Moreover, the operation controller 86 receives a manipulation input on the manipulation unit 6 on the basis of the manipulation signal input from the manipulation unit 6 to switch on or off the illumination unit 5, change a display content on the display unit 41, or perform various settings. The operation controller 86 can display information on the meter unit 201 by outputting a display request to the meter unit 201 via the external connecting unit 7. The operation controller 86 can output a support request signal to the ADAS ECU 202 via the external connecting unit 7 and obtain the aforementioned vehicle information, the surrounding situation information, or the like. The operation controller 86 can control the operation of the alarming device 9 by outputting a driving signal to the alarming device 9 via the external connecting unit 7.

The operation controller 86 performs a warning processing in a case where the number of occupants counted by the counting unit 85 exceeds a seating capacity of the vehicle 100. By executing the warning processing, the operation controller 86 can cause the output unit 4 to output warning information indicating overloading or cause the alarming device 9 to warn overloading via the external connecting unit 7.

Figure 5:
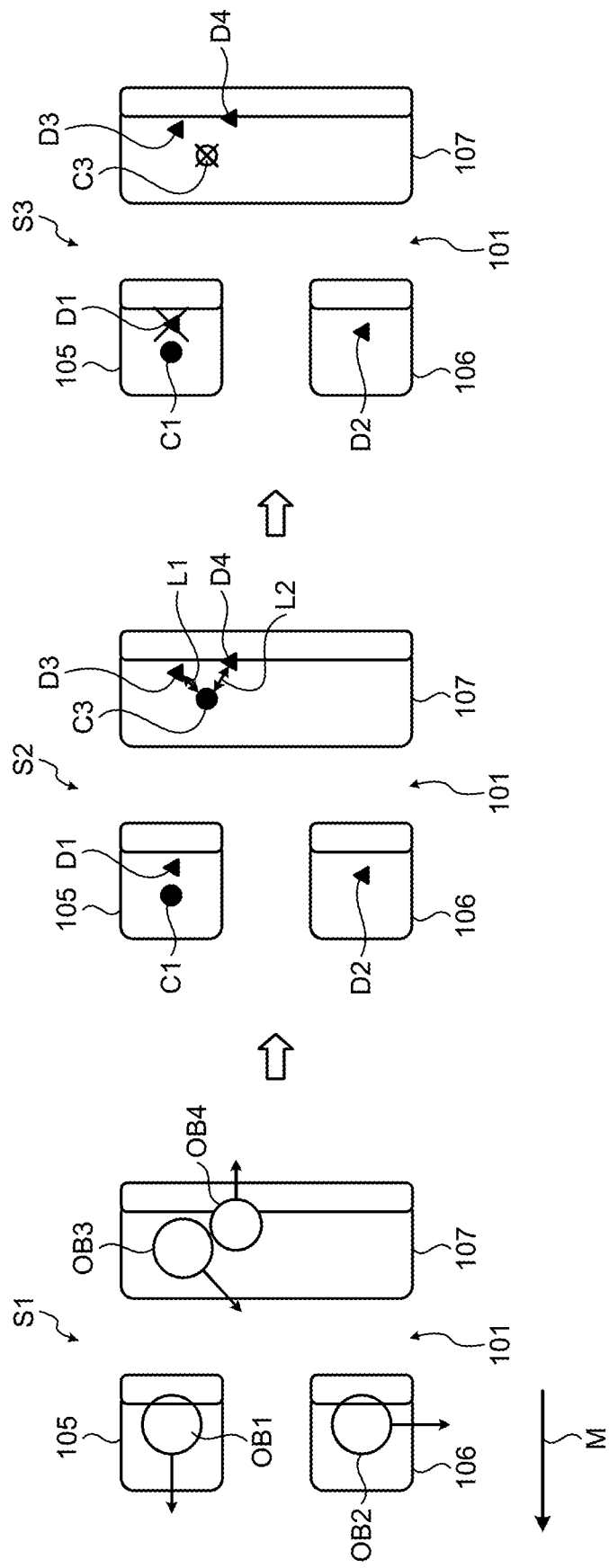
FIG. 5 is a diagram illustrating an exemplary counting operation of the vehicle occupant count monitoring system according to the embodiment.

Next, an exemplary operation of counting the number of occupants using the vehicle occupant count monitoring system 1 will be described with reference to FIG. 5. FIG. 5 is a diagram illustrating an exemplary counting operation in the vehicle occupant count monitoring system 1 according to the embodiment.

In Step S1 of FIG. 5, the occupants OB1, OB2, OB3, and OB4 board the cabin 101 of the vehicle 100. Specifically, the occupant OB1 sits on the driver's seat 105 of the vehicle 100 and orients the face to a travel direction M of the vehicle 100. The occupant OB2 sits on the front passenger seat 106 of the vehicle 100 and orients the face to a direction different from the travel direction M. The occupant OB3 sits on the backseat 107 of the vehicle 100 and orients the face to the travel direction M. The occupant OB4 is a child of the occupant OB3 and is positioned on the backseat 107 of the vehicle 100 while being held by the occupant OB3 and orients the face to a direction opposite to the travel direction M.

In Step S1, the imaging unit 3 of the vehicle occupant count monitoring system 1 captures the depth image G of the cabin 101 including the occupants OB1, OB2, OB3, and OB4. The imaging unit 3 stores the captured depth image G in the storage unit 81.

In Step S2, the facial recognizing unit 83 of the vehicle occupant count monitoring system 1 recognizes a face of the occupant OB1 on the driver's seat 105 and a face of the occupant OB3 on the backseat 107 from the two-dimensional image G1 of the depth image G captured by the imaging unit 3. That is, the facial recognizing unit 83 can not recognize the face of the occupant OB2 on the front passenger seat 106 and the face of the occupant OB4 on the backseat 107 from the two-dimensional image G1 of the depth image G. As a result, the facial recognizing unit 83 calculates the first coordinates C1 in the vicinity of the driver's seat 105 and the first coordinates C3 in the vicinity of the backseat 107.

In Step S2, the upper half body recognizing unit 84 of the vehicle occupant count monitoring system 1 recognizes an upper half body of the occupant OB1 on the driver's seat 105, an upper half body of the occupant OB2 on the front passenger seat 106, an upper half body of the occupant OB3 on the backseat 107, and an upper half body of the occupant OB4 on the backseat 107 from the distance image G2 of the depth image G captured by the imaging unit 3. As a result, the upper half body recognizing unit 84 calculates the second coordinates D1 in the vicinity of the driver's seat 105, the second coordinates D2 in the vicinity of the front passenger seat 106, and two second coordinates D3 and D4 in the vicinity of the backseat 107.

In Step S2, the counting unit 85 of the vehicle occupant count monitoring system 1 determines combinations of the first coordinates C1 and C3 calculated by the facial recognizing unit 83 and the second coordinates D1, D2, D3, and D4 calculated by the upper half body recognizing unit 84. For example, the counting unit 85 obtains combinations by which distances between the first coordinates C1 and C3 and the second coordinates D1, D2, D3, and D4 become shorter than the determination threshold value. As a result, the counting unit 85 determines that the first coordinates C1 and the second coordinates D1 are combined one to one for the driver's seat 105. The counting unit 85 determines that there is no first coordinates paired with the second coordinates D1 for the front passenger seat 106. The counting unit 85 determines that the first coordinates C3 and the second coordinates D3 and D4 are combined one to two for the backseat 107. Note that, in the example of FIG. 5, it is assumed that a distance L1 between the first coordinates C3 and the second coordinates D3 is shorter than a distance L2 between the first coordinates C3 and the second coordinates D4.

In Step S3, the counting unit 85 invalidates the second coordinates D1 of the driver's seat 105 and the first coordinates C3 of the backseat 107 on the basis of the combination result. As a result, the counting unit 85 normalizes each of the first coordinates C1 of the driver's seat 105, the second coordinates D2 of the front passenger seat 106, and the second coordinates D3 and D4 of the backseat 107. In addition, the counting unit 85 counts the number of the four normalized coordinates including the first coordinates C1, the second coordinates D2, D3, and D4, and counts the number of occupants OB1, OB2, OB3, and OB4 in the cabin 101 as "four occupants". The counting unit 85 stores the counted number of occupants in the occupant count information 81b. That is, since the second coordinates D3 and D4 have distances from the first coordinates C3 shorter than the determination threshold value, the counting unit 85 counts the first coordinates C3 and the second coordinates D3 having the short distance as "one occupant" by combining them, and counts the remaining second coordinates D4 as "one occupant".

For example, assuming that a sitting occupant OB puts a luggage in front of the occupant OB, and the luggage is sized from the foot to the chest, the vehicle occupant count monitoring system 1 may recognize a face of the occupant OB from the two-dimensional image G1 of the depth image G captured by the imaging unit 3 and may not recognize an upper half body of the occupant OB from the distance image G2 due to this luggage. In this case, the vehicle occupant count monitoring system 1 can recognize the face of the occupant OB from the two-dimensional image G1 of the depth image G. Therefore, it is also possible to count the occupant OB whose upper half body is not recognized from the distance image G2 as the number of occupants in the cabin 101.

The vehicle occupant count monitoring system 1 described above counts the number of occupants OB by combining the face of the occupant OB recognized from the depth image G using the facial recognizing unit 83 and the upper half body of the occupant OB recognized from the depth image G using the upper half body recognizing unit 84. For example, in a case where the occupant OB takes a nap while facing the bottom, it may be difficult to recognize the face of the occupant OB for a long time. In this case, the vehicle occupant count monitoring system 1 can count the sleeping occupant OB on the basis of the upper half body of the occupant OB. As a result, the vehicle occupant count monitoring system 1 can count the number of occupants OB by recognizing at least one of the face and the upper half body from the depth image G. Therefore, it is possible to improve accuracy of the vehicle occupant counting.

The counting unit 85 of the vehicle occupant count monitoring system 1 counts the number of occupants OB by combining the three-dimensional first coordinates of the face recognized by the facial recognizing unit 83 and the three-dimensional second coordinates of the head of the upper half body recognized by the upper half body recognizing unit 84. As a result, the vehicle occupant count monitoring system 1 checks a combination of the three-dimensional coordinates of the neighboring human body parts such as the face and the head of the occupant OB, so that it is possible to improve accuracy of determination for the combination.

If the distance between the first and second coordinates is shorter than the predetermined determination threshold value of the necessary information 81a, the counting unit 85 of the vehicle occupant count monitoring system 1 counts the face recognized by the facial recognizing unit 83 and the upper half body recognized by the upper half body recognizing unit 84 as "one occupant" by combining them. If the distance between the first and second coordinates is equal to or longer than the determination threshold value, the counting unit 85 counts the face recognized by the facial recognizing unit 83 and the upper half body recognized by the upper half body recognizing unit 84 as "each occupant" without combining them. As a result, the vehicle occupant count monitoring system 1 prevents the first and second coordinates positioned distant from being combined, so that it is possible to use the three-dimensional coordinates of a plurality of occupants OB positioned close in the counting. Therefore, it is possible to further improve accuracy of the vehicle occupant counting.

If the distance between any one of the first and second coordinates and the other of the first and second coordinates is shorter than the determination threshold value of the necessary information 81a, and there are a plurality of the other coordinates, the counting unit 85 of the vehicle occupant count monitoring system 1 counts the first and second coordinates with the distance between them being short as "one occupant" by combining them and counts the remaining coordinates as "each occupant". As a result, the vehicle occupant count monitoring system 1 can count the number of a plurality of occupants OB even when faces, heads, or the like of a plurality of occupants OB are positioned close. Therefore, it is possible to further improve accuracy of the vehicle occupant counting.

Since each part of the vehicle occupant count monitoring system 1 including the imaging unit 3 and the controller 8 is provided in the casing 2, it is possible to modularize the entire vehicle occupant count monitoring system 1 as an overhead module. In this configuration, it is possible to improve mountability of the vehicle occupant count monitoring system 1 on the vehicle 100.

Figure 6:
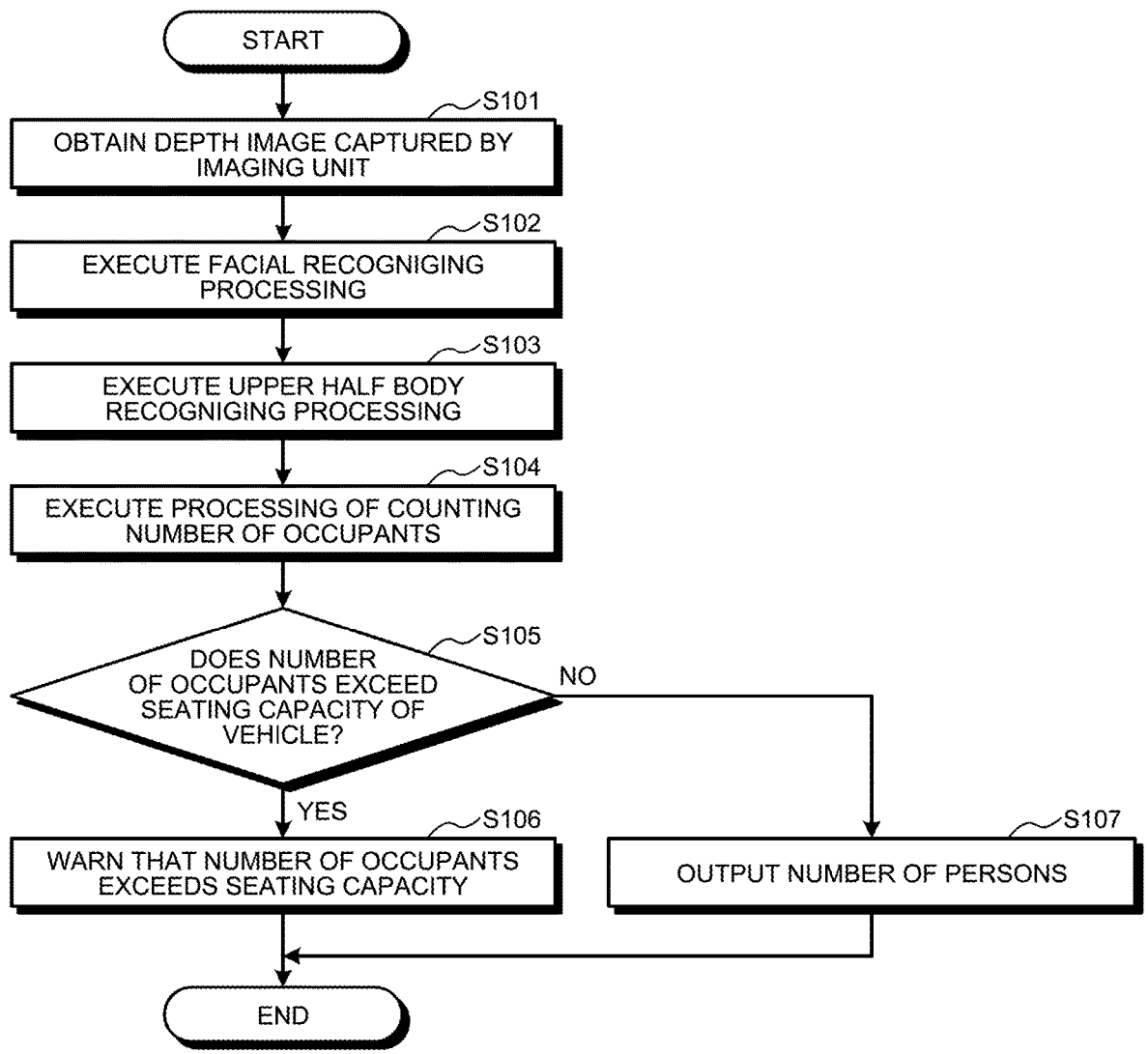
FIG. 6 is a flowchart illustrating an exemplary control of a processor of the vehicle occupant count monitoring system according to the embodiment.

Next, an exemplary control of the processor 82 of the controller 8 will be described with reference to the flowchart of FIG. 6. FIG. 6 is a flowchart illustrating an exemplary control of the processor 82 of the vehicle occupant count monitoring system 1 according to the embodiment. The flowchart shown in FIG. 6 illustrates an exemplary processing sequence for monitoring the number of occupants of the vehicle 100. The processing sequence of FIG. 6 is implemented by causing the processor 82 to execute a program. The processing sequence of FIG. 6 is repeatedly executed by the processor 82.

First, the processor 82 of the controller 8 of the vehicle occupant count monitoring system 1 obtains the depth image G captured by the imaging unit 3 (Step S101). In addition, the processor 82 executes a facial recognizing processing (Step S102). The facial recognizing processing is, for example, a processing of recognizing a face of the occupant OB from the two-dimensional image G1 of the depth image G obtained in Step S1 and calculating three-dimensional coordinates of the recognized face. Note that the facial recognizing processing will be described below in details. The processor 82 functions as the aforementioned facial recognizing unit 83 by executing the processing of Step S102. In addition, the processor 82 advances the processing to Step S103 as the facial recognizing processing is terminated.

The processor 82 executes an upper half body recognizing processing (Step S103). The upper half body recognizing processing is, for example, a processing of recognizing an upper half body of the occupant OB from the distance image G2 of the depth image G obtained in Step S1 and calculating three-dimensional coordinates of the head portion of the recognized upper half body. Note that the upper half body recognizing processing will be described below in details. The processor 82 functions as the aforementioned upper half body recognizing unit 84 by executing the processing of Step S103. In addition, as the upper half body recognizing processing is terminated, the processor 82 advances the processing to Step S104.

The processor 82 executes an occupant counting processing (Step S104). The counting processing is, for example, a processing of counting the number of occupants by combining the first coordinates calculated in Step S2 and the second coordinates calculated in Step S3. Note that the counting processing will be described below in more details. The processor 82 functions as the aforementioned counting unit 85 by executing the processing of Step S104. In addition, the processor 82 advances the processing to Step S105 as the counting processing is terminated.

The processor 82 determines whether or not the number of occupants exceeds the seating capacity of the vehicle 100 (Step S105). For example, the processor 82 determines that the number of occupants exceeds the seating capacity of the vehicle 100 if the number of occupants counted in Step S104 exceeds the seating capacity of the vehicle 100 indicated in the necessary information 81a. If it is determined that the number of occupants exceeds the seating capacity of the vehicle 100 (Yes in Step S105), the processor 82 advances the processing to Step S106.

The processor 82 warns that the number of occupants exceeds the seating capacity (Step S106). For example, the processor 82 causes the output unit 4 to output warning information indicating the overloading. As a result, the output unit 4 outputs the warning information to the occupant OB to warn the overloading. Note that the processor 82 may request the alarming device 9, the meter unit 201, or the like to transmit the alarm using the warning information via the external connecting unit 7. As a result, the alarming device 9, the meter unit 201, or the like can warn the overloading on the basis of the warning information. The processor 82 functions as the aforementioned operation controller 86 by executing the processing of Step S106. As the alarm is output, the processor 82 terminates the processing sequence of FIG. 6.

If it is determined that the number of occupants does not exceed the seating capacity of the vehicle 100 (No in Step S105), the processor 82 advances the processing to Step S107. The processor 82 output the number of occupants (Step S107). For example, the processor 82 causes the output unit 4 to output the information indicating the number of occupants counted in Step S104. As a result, the output unit 4 can output the number of occupants to the occupant OB. Note that the processor 82 may output information indicating the number of occupant to the meter unit 201 via the external connecting unit 7. As the number of occupants is output, the processor 82 terminates the processing sequence of FIG. 6.

As described above, in the processing sequence of FIG. 6, the number of occupants is output in Step S107 if the number of occupants does not exceed the seating capacity of the vehicle 100. However, the present embodiment is not limited thereto. For example, in the processing sequence of FIG. 6, the processing of Step S107 may be deleted, so that the processing is not performed if the number of occupants does not exceed the seating capacity of the vehicle 100.

In the vehicle occupant count monitoring system 1 described above, the operation controller 86 performs the warning processing if the number of occupants counted by the counting unit 85 exceeds the seating capacity of the vehicle 100. As a result, since the counting accuracy of the vehicle occupant count monitoring system 1 is improved, it is possible to improve the warning accuracy by warning that the number of occupants exceeds the seating capacity of the vehicle 100. In particular, even when faces of a plurality of occupants OB are positioned close, the vehicle occupant count monitoring system 1 can accurately count the number of occupants. Therefore, it is possible to improve accuracy of the warning for the overloading.

Figure 7:
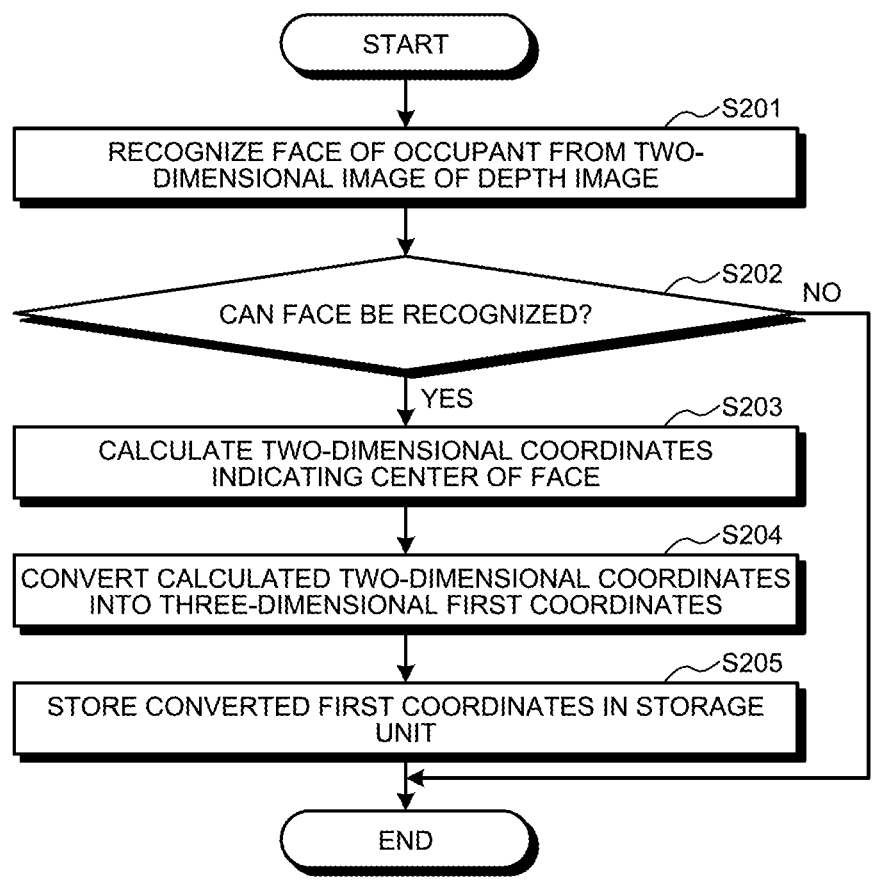
FIG. 7 is a flowchart illustrating an exemplary facial recognizing processing of the vehicle occupant count monitoring system according to the embodiment.

Next, an exemplary facial recognizing processing using the processor 82 of the controller 8 will be described with reference to the flowchart of FIG. 7. FIG. 7 is a flowchart illustrating an exemplary facial recognizing processing of the vehicle occupant count monitoring system 1 according to the embodiment. The processing sequence of FIG. 7 is implemented as the processor 82 executes a program. The processing sequence of FIG. 7 is activated as the processor 82 executes Step S102 of FIG. 6.

First, the processor 82 of the controller 8 of the vehicle occupant count monitoring system 1 recognizes a face of the occupant OB from the two-dimensional image G1 of the depth image G (Step S201). For example, the processor 82 recognizes a face of the occupant OB from the two-dimensional image G1 by collating a result of scanning the two-dimensional image G1 of the depth image G and the feature amounts of the face of the learning dictionary. The processor 82 advances the processing to Step S202 as the face recognition result is stored in the storage unit 81.

The processor 82 determines whether or not a face can be recognized on the basis of the recognition result of Step S201 (Step S202). If it is determined that it is difficult to recognize a face (No in Step S202), the processor 82 terminates the processing sequence of FIG. 7 and returns to the processing sequence of FIG. 6. If it is determined that a face can be recognized (Yes in Step S202), the processor 82 advances the processing to Step S203.

The processor 82 calculates the two-dimensional coordinates indicating a center of the face (Step S203). For example, the processor 82 calculates the two-dimensional coordinates (x,y) indicating the center of the face in the two-dimensional image G1 used to recognize the face. In addition, the processor 82 converts the calculated two-dimensional coordinates (x,y) into three-dimensional first coordinates (Step S204). For example, the processor 82 projects the two-dimensional coordinates (x,y) indicating the center of the face onto the distance image G2, that is, obtains three-dimensional coordinates (x,y,z) in the distance image G2 corresponding to the center of the face as the first coordinates. In addition, the processor 82 may obtain the first coordinates by calculating a trim average value of a spherical range having a predetermined radius centered on the three-dimensional coordinates (x,y,z) indicating the center of the face. In addition, the processor 82 stores the converted first coordinates in the storage unit 81 (Step S205). Then, the processor 82 terminates the processing sequence of FIG. 7 and returns to the processing sequence of FIG. 6.

Note that, although, in the processing sequence of FIG. 7, it is assumes that the processing is performed for each of a plurality of faces in steps S203 to S205 when a plurality of faces are recognized from the two-dimensional image G1 of the depth image G, the present embodiment is not limited thereto. For example, in the processing sequence of FIG. 7, a series of processings of steps S203 to S205 may be repeated as many as the number of the recognized faces.

Figure 8:
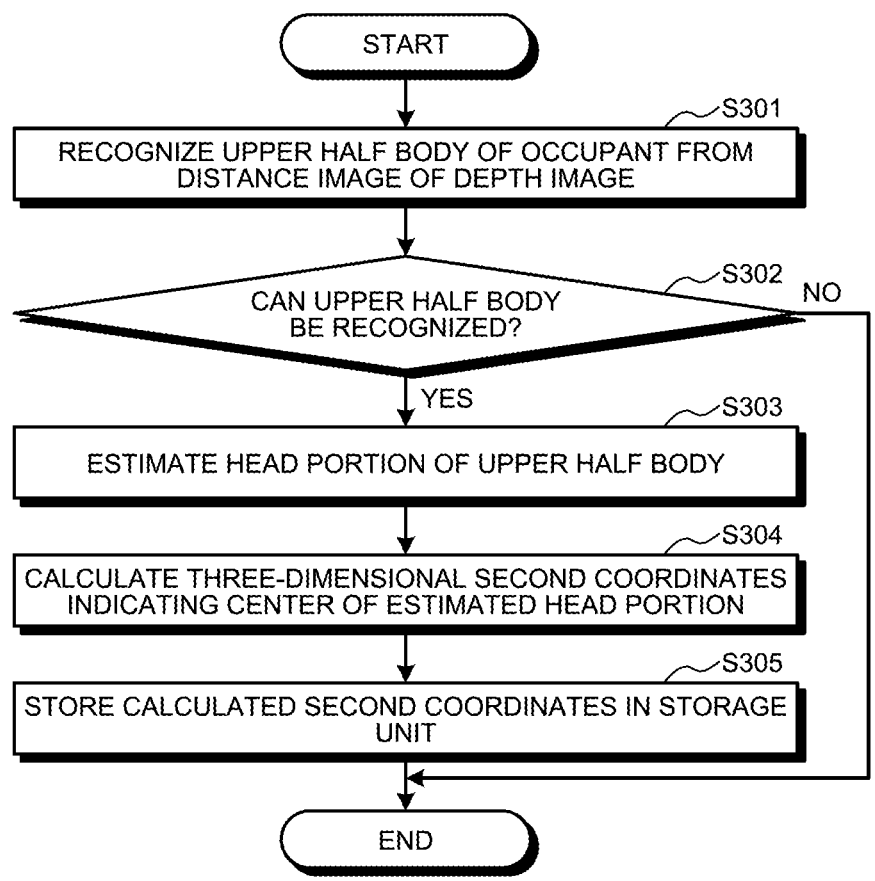
FIG. 8 is a flowchart illustrating an exemplary upper half body recognizing processing of the vehicle occupant count monitoring system according to the embodiment.

Next, an exemplary upper half body recognizing processing using the processor 82 of the controller 8 will be described with reference to the flowchart of FIG. 8. FIG. 8 is a flowchart illustrating an exemplary upper half body recognizing processing of the vehicle occupant count monitoring system 1 according to the embodiment. The processing sequence of FIG. 8 is implemented as the processor 82 executes a program. The processing sequence of FIG. 8 is activated as the processor 82 executes Step S103 of FIG. 6.

First, the processor 82 of the controller 8 of the vehicle occupant count monitoring system 1 recognizes an upper half body of the occupant OB from the distance image G2 of the depth image G (Step S301). For example, the processor 82 recognizes an upper half body of the occupant OB from the distance image G2 by collating a result of scanning the distance image G2 of the depth image G and the feature amounts of the upper half body of the learning dictionary. The processor 82 advances the processing to Step S302 as the upper half body recognition result is stored in the storage unit 81.

The processor 82 determines whether or not an upper half body can be recognized on the basis of the recognition result of Step S301 (Step S302). If it is determined that it is difficult to recognize an upper half body (No in Step S302), the processor 82 terminates the processing sequence of FIG. 8, and returns to the processing sequence of FIG. 6. If it is determined that an upper half body can be recognized (Yes in Step S302), the processor 82 advances the processing to Step S303.

The processor 82 estimates a head portion of the upper half body (Step S303). For example, the processor 82 estimates a head portion of the upper half body by collating the upper half body recognized from the distance image G2 and the feature amounts of the head portion of the learning dictionary. In addition, the processor 82 calculates three-dimensional second coordinates indicating a center of the estimated head portion (Step S304). For example, the processor 82 calculates three-dimensional coordinates (x,y,z) indicating the center of the head portion of the upper half body in the distance image G2 used to recognize the upper half body. Note that the processor 82 may calculate the second coordinates by calculating a trim average value of a range of the head portion in the distance image G2. In addition, the processor 82 stores the calculated second coordinates in the storage unit 81 (Step S305). Then, the processor 82 terminates the processing sequence of FIG. 8, and returns to the processing sequence of FIG. 6.

Note that, although, in the processing sequence of FIG. 8, it is assumed that the processing is performed for each of a plurality of upper half bodies in steps S303 to S305 when a plurality of upper half bodies are recognized from the distance image G2 of the depth image, the present embodiment is not limited thereto. For example, in the processing sequence of FIG. 8, a series of processings of steps S303 to S305 may be repeated as many as the number of the recognized upper half bodies.

Next, an exemplary counting processing using the processor 82 of the controller 8 will be described with reference to the flowchart of FIG. 9. FIG. 9 is a flowchart illustrating an exemplary counting processing of the vehicle occupant count monitoring system 1 according to the embodiment. The processing sequence of FIG. 9 is implemented as the processor 82 executes a program. The processing sequence of FIG. 9 is activated as the processor 82 executes Step S104 of FIG. 6.

First, the processor 82 of the controller 8 of the vehicle occupant count monitoring system 1 unifies the first and second coordinates (Step S401). For example, the processor 82 plots the first coordinates calculated in the facial recognizing processing and the second coordinates calculated in the upper half body recognizing processing on a three-dimensional space of the cabin 101. In addition, the processor 82 detects a combination by which a distance between the first and second coordinates is shorter than a determination threshold value (Step S402). For example, in the case of FIG. 5, the processor 82 detects two combinations including a one-to-one combination between the first coordinates C1 and the second coordinates D1, and a one-to-two combination between the first coordinates C3 and the second coordinates D3 and D4.

The processor 82 determines whether or not a combination is detected on the basis of a detection result of Step S402 (Step S403). If it is determined that the combination is not detected (No in Step S403), the processor 82 advances the processing to Step S409 described below. If it is determined that the combination is detected (Yes in Step S403), the processor 82 advances the processing to Step S404.

The processor 82 determines whether or not there is a one-to-one combination pattern on the basis of the detection result of Step S402 (Step S404). If it is determined that there is not one-to-one combination pattern (No in Step S404), the processor 82 advances the processing to Step S406 described below. If it is determined that there is a one-to-one combination pattern (Yes in Step S404), the processor 82 advances the processing to Step S405.

The processor 82 associates the one-to-one combination of the first and second coordinates (Step S405). For example, in the case of FIG. 5, the processor 82 associates the first coordinates C1 and the second coordinates D1. Note that, if there are a plurality of one-to-one combinations of the first and second coordinates, the processor 82 performs the associating processing for all combinations. The processor 82 advances the processing to Step S406 as the processing of Step S405 is terminated.

The processor 82 determines whether or not there is another combination pattern different from the one-to-one combination pattern on the basis of the detection result of Step S402 (Step S406). If it is determined that there is no combination pattern different from the one-to-one combination pattern (No in Step S406), the processor 82 advances the processing to Step S408 described below. If it is determined that there is another combination pattern different from the one-to-one combination pattern (Yes in Step S406), the processor 82 advances the processing to Step S407.

The processor 82 associates a combination of the first and second coordinates having the shortest distance out of a plurality of combination patterns (Step S407). For example, in the case of FIG. 5, a plurality of combination patterns include a combination pattern of the first coordinates C3 and the second coordinates D3, and a combination pattern of the first coordinates C3 and the second coordinates D4. In this case, the processor 82 obtains a distance L1 between the first coordinates C3 and the second coordinates D3 and a distance L2 between the first coordinates C3 and the second coordinates D4. In addition, since the distance L1 is shorter than the distance L2, the processor 82 associates the first coordinates C3 and the second coordinates D3. That is, the processor 82 does not associate the first coordinates C3 and the second coordinates D4. As the processing of Step S407 is terminated, the processor 82 advances the processing to Step S408.

The processor 82 normalizes one of the associated first and second coordinates (Step S408). For example, the processor 82 normalizes one of the associated first and second coordinates and deletes the other coordinates on the basis of information for designating the three-dimensional coordinates to be deleted out of the first and second coordinates or the like. In addition, the processor 82 advances the processing to Step S409 as the normalized three-dimensional coordinates are stored in the storage unit 81.

The processor 82 normalizes the first and second coordinates that are not associated (Step S409). That is, if only one of the first and second coordinates is calculated from the depth image G for the occupant OB, the processor 82 normalizes the calculated three-dimensional coordinates. In addition, as the normalized three-dimensional coordinates are stored in the storage unit 81, the processor 82 advances the processing to Step S410. Note that, if the first and second coordinates that are not associated are not stored in the storage unit 81, the processor 82 does not perform the processing of Step S409, and advances the processing to Step S410.

The processor 82 counts the number of the normalized three-dimensional coordinates as the number of occupants (Step S410). For example, if the number of the normalized three-dimensional coordinates is "four", the processor 82 counts the number of occupants as "four occupants". In addition, as the counted number of occupants is stored in the occupant count information 81b, the processor 82 terminates the processing sequence of FIG. 9, and returns to the processing sequence of FIG. 6.

Although the vehicle occupant count monitoring system 1 monitors the overloading on the basis of the counted number of passengers in the aforementioned description, the present embodiment is not limited thereto. For example, the vehicle occupant count monitoring system 1 may store the counted number of passengers in the storage unit 81 as a boarding history of the vehicle 100 or may output it to an external device that monitors the vehicle 100 via the external connecting unit 7.

Although the vehicle occupant count monitoring system 1 is installed on a cabin 101 side surface of the ceiling 102 of the vehicle 100 as a whole and constitutes an overhead module in the aforementioned description, the present embodiment is not limited thereto. For example, the controller 8 of the vehicle occupant count monitoring system 1 may be provided outside the casing 2 and may be electrically connected to each part using a wiring material. For example, the controller 8 may be shared by a vehicle ECU that comprehensively controls each part of the vehicle 100. In addition, the vehicle occupant count monitoring system 1 may be incorporated into another in-vehicle device such as a drive recorder, a meter unit, a navigation device, or a car audio device mounted on the vehicle 100.

In the vehicle occupant count monitoring system according to the present embodiment, the number of occupants is counted by combining first coordinates of a face recognized from a depth image by the facial recognizing unit and second coordinates of an upper half body recognized from a depth image by the upper half body recognizing unit. As a result, the vehicle occupant count monitoring system 1 can count the number of occupants if at least one of the face and the upper half body can be recognized from the depth image. Therefore, it is possible to improve accuracy of the vehicle occupant counting.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle occupant count monitoring system comprising:
a memory storing instructions and storing a learning dictionary for recognizing a face and a upper half body of the occupant, the learning dictionary including information in which face features and upper half body features are made into a database; and
at least one hardware processor configured to execute the instructions to implement:
capturing depth image including a two-dimensional image and distance image with three-dimensional information of an occupant in a cabin of a vehicle;
extracting a pixel part having a pixel value different from that of an interior image of the cabin as a human body part of the occupant by comparing only the two-dimensional image and the interior image of the cabin captured in advance, recognizing the face of the occupant and the upper half body of the occupant from the human body part in the two-dimensional image by collating with the information included in the learning dictionary, and calculating three-dimensional first coordinates of the face in the cabin from the two-dimensional image and the distance image;
calculating three-dimensional second coordinates of a head of the upper half body in the cabin; and
counting the number of occupants by combining the first coordinates and the second coordinates, wherein
when a distance between one of the first coordinates and one of the second coordinates is shorter than a predetermined threshold value, the number of occupants is counted as one occupant by associating the first coordinates and the second coordinates, and
when the distance between one of the first coordinates and one of the second coordinates is equal to or longer than the predetermined threshold value, the number of occupants is counted as two separate occupants without associating the first coordinates and the second coordinates.

2. The vehicle occupant count monitoring system according to claim 1, wherein
when the distance between any one of the first and second coordinates and the other of the first and second coordinates is shorter than the predetermined threshold value, and there are a plurality of the other coordinates, counting the number of occupants comprises counting the number of occupants as one occupant by associating the first and second coordinates with the distance between them being short, and counts the first and second coordinates that is not associated as the number of occupants as each occupant.

3. The vehicle occupant count monitoring system according to claim 1, wherein the at least one hardware processor is further configured to implement the instructions to execute:

performing a warning when counting the number of occupants results in determining that the number of occupants exceeds a predetermined seating capacity of the vehicle.

4. The vehicle occupant count monitoring system according to claim 2, wherein the at least one hardware processor is further configured to implement the instructions to execute:

performing a warning when counting the number of occupants results in determining that the number of occupants exceeds a predetermined seating capacity of the vehicle.

5. The vehicle occupant count monitoring system according to claim 1, further comprising:

a casing provided on a cabin side surface of a ceiling of the vehicle and mounted with at least one of the memory and the at least one hardware processor.

6. The vehicle occupant count monitoring system according to claim 2, further comprising:

a casing provided on a cabin side surface of a ceiling of the vehicle and mounted with at least one of the memory and the at least one hardware processor.

7. The vehicle occupant count monitoring system according to claim 3, further comprising:

a casing provided on a cabin side surface of a ceiling of the vehicle and mounted with at least one of the memory and the at least one hardware processor.

8. The vehicle occupant count monitoring system according to claim 4, further comprising:

a casing provided on a cabin side surface of a ceiling of the vehicle and mounted with at least one of the memory and the at least one hardware processor.

* * * * *